United States Patent [19]
Ogata

[11] Patent Number: 5,233,407
[45] Date of Patent: Aug. 3, 1993

[54] DISPLACEMENT SIGNAL OUTPUT DEVICE
[75] Inventor: Shiro Ogata, Kyoto, Japan
[73] Assignee: Omron Corporation, Kyoto, Japan
[21] Appl. No.: 800,362
[22] Filed: Dec. 3, 1991
[30] Foreign Application Priority Data Dec. 3, 1990 [JP] Japan .................. 2-404582

[51] Int. Cl.5 ............................................. G01B 11/00
[52] U.S. Cl. .................................. 356/373; 356/374;
250/237 G; 33/707
[58] Field of Search ...................... 356/373, 374, 395;
250/231.13, 237 G; 341/13; 33/707

[56] References Cited
U.S. PATENT DOCUMENTS

| 2,948,890 | 8/1960  | Barth et al. ........................ 341/13 |
| 3,214,751 | 10/1965 | Johnson ............................. 341/13 |
| 3,344,700 | 10/1967 | Brake ............................... 356/373 |
| 4,176,276 | 11/1979 | Kaul et al. ..................... 250/237 G |
| 4,654,523 | 3/1987  | Tanaka et al. ................ 250/231.13 |
| 4,684,257 | 8/1987  | Hanaoka et al. .............. 250/237 G |
| 4,843,237 | 6/1989  | Michel ............................. 356/373 |

FOREIGN PATENT DOCUMENTS 2072850 10/1981 United Kingdom ............... 33/707

Primary Examiner—F. L. Evans
Attorney, Agent, or Firm—Foley & Lardner

[57] ABSTRACT

The invention provides a thin-profile displacement signal output device. The device comprises a first member having a periodic pattern consisting of alternating high-transmittance and low-transmittance regions, a second member having a periodic pattern consisting of alternating high-reflectance regions, a light emitting source for emitting a detection light beam and a light-receiver for receiving the reflected light, the first member and second member facing each other and spaced apart by a distance which is smaller than the pitch of the periodic pattern, the light-emitting source and light receiver means being both disposed on one side of said first member which is opposite to the side on which said second member is disposed, and the first and second member being displaceable relative to each other.

4 Claims, 7 Drawing Sheets

DISPLACEMENT SIGNAL OUTPUT DEVICE

BACKGROUND OF THE INVENTION

1. Field of the Invention

The present invention relates to a displacement signal output device which covers both linear and rotary encoders.

2. Related Art

Figure 13:
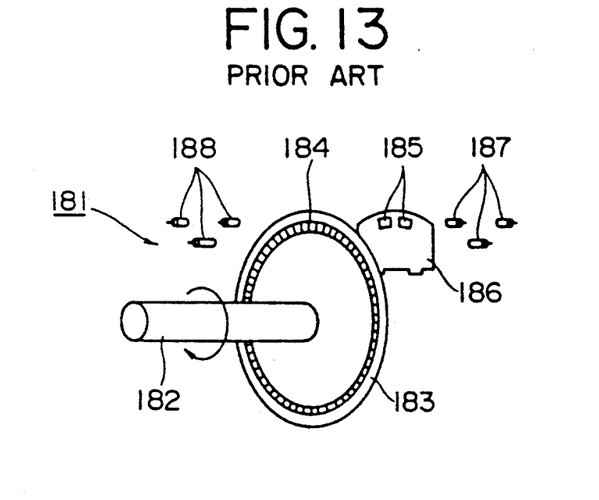
FIG. 13 is a perspective view of a conventional device.

The dominant type of displacement signal output devices in use today is a rotary encoder of the transmission type such as that illustrated in FIG. 13. This conventional rotary encoder 181 comprises a rotary disk 183 fixedly mounted on a shaft 182 and provided with a plurality of slits 194 at a constant pitch. Disposed in confronting relation with the rotary disk 183, is a stationary slit plate 186 provided with a plurality of slits 185 disposed at the same pitch as above. The device further includes a light-emitting means 187 and a light-receiving means 188, the former being disposed on the side of the slit plate 186 and the latter on the side of the rotary disk 183.

This arrangement, however, has several disadvantages. First, because the light-emitting means and the light-receiving means are disposed closer to the stationary slit plate and the rotary disk, respectively, it is difficult to implement a displacement signal output device in a compact unit with a flat profile. Furthermore, because the light-emitting means and the light-receiving means are not disposed on the same side, there is imposed a fair restriction on the layout of component members, and it is sometimes difficult to install the device in the required position or build the device into machinery. Moreover, since both the rotary disk and the stationary slit plate should transmit light, there are limitations on the material and construction of these members. For example, only transparent materials or materials in which slits may be formed can be utilized. This, too, narrows the applicability of the device.

As a reflection type displacement signal output device, a linear encoder of the diffraction interference type is also known. In this type of system, laser light is projected on a movable scale provided with a diffraction grating, and the amount of shift in the interference pattern of diffracted light is used to detect the amount of displacement.

Although such an encoder of the diffraction interference type features a high resolution, it unfortunately requires many optical elements, for example three reflectors and a half-mirror, so that the optical system is complicated and the device is of necessity large. In addition, any adjustment calls for a complicated and costly procedure and, moreover, the device is easily susceptible to environmental factors.

SUMMARY OF THE INVENTION

An object of the invention is to provide a displacement signal output device which can be implemented as thin-profile hardware and can be easily built into machinery, is simple in construction, and can be fabricated at low cost.

In accordance with one aspect of the invention, a displacement signal output device comprises a first member having high-transmittance regions and low-transmittance regions in an alternating pattern with a constant pitch, a second member having high-reflectance regions and low-reflectance regions in a similar alternating pattern with the same pitch, a light-emitting means for emitting a detection light beam and a light-receiving means for receiving a reflected detection light, said first member and said second member facing each other and spaced apart by a distance smaller than said pitch, said light-projecting means and light-receiving means being both disposed on one side of said first means which is opposite to the side on which said second member is disposed.

In accordance with another aspect of the invention, the pattern of said high-reflectance regions and low-reflectance regions of said second member may be constituted by a corrugated surface.

In accordance with yet another aspect of the invention, said light-emitting and light-receiving means may be packaged in a housing having a window, and said first member may be affixed to said window.

In another embodiment of the invention, the pattern on said first member or on said second member consists of at least two partial patterns separated by a line normal to the direction of displacement, and a plurality of light-receiving means are respectively disposed in positions corresponding to said partial patterns.

In accordance with still another aspect of the invention, the high-transmittance and low-transmittance regions of said first member and the high-reflectance and low-reflectance regions of said second member may be inclined with respect to the direction of displacement of said first or second member.

Inasmuch as, in the present invention, the light-emitting means and the light-receiving means are disposed on the same side with respect to the first and second members, the two means can be strategically arranged so as to reduce the thickness of the whole device. For the same reason, the installation of the device or assembling thereof into a system is facilitated.

Furthermore, as the distance between the first and the second member is smaller than the pattern pitch of the two members, many limitations on the material and construction of the second means are alleviated not only when the pattern of the second means consists of high-reflectance regions and low-reflectance regions but even when the same pattern is constituted by a corrugated surface.

One aspect of the invention also provides for a method of providing the above displacement signal devices. Another aspect of the invention provides for a method of detecting displacement using the above embodiments.

Since the displacement signal output device of the invention is thus simple in principle and construction, it can be manufactured at low cost and easily adjusted an maintained.

BRIEF DESCRIPTION OF THE DRAWINGS

The preferred exemplary embodiments of the present invention will be described in conjunction with the appended drawings, wherein.

DETAILED DESCRIPTION OF THE PREFERRED EMBODIMENTS

Figure 1:
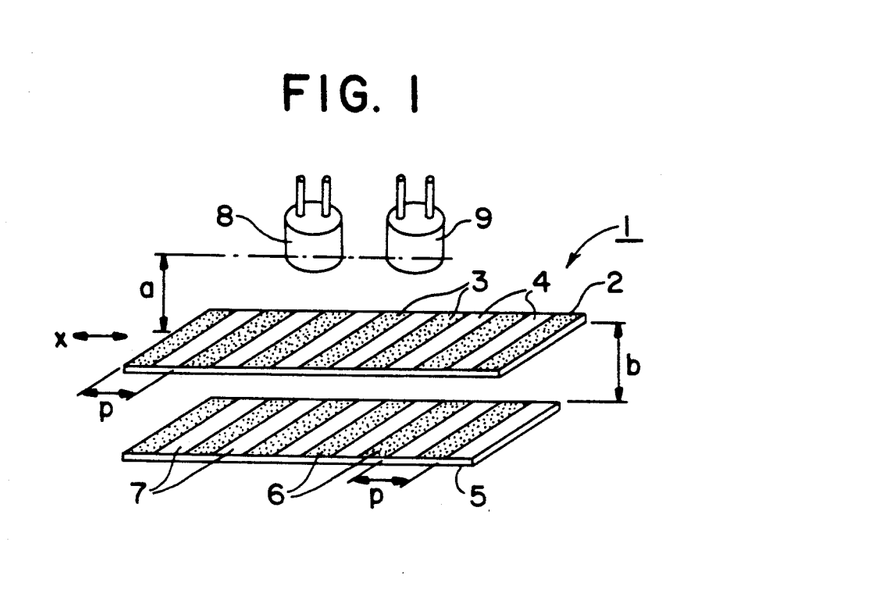
FIG. 1 is a perspective view showing a first embodiment of the invention.

A first embodiment of a displacement signal output device is shown in FIG. 1. This device, indicated generally by 1, comprises a light-emitting means 8, such as a light-emitting diode, a light-receiving means 9, such as a phototransistor, a partially transparent plate member 2 and a partially reflective member 5. The partially transparent plate member 2 has pluralities of non-transparent regions 3 and transparent regions 4, each extending in a direction normal to its direction of displacement x, in an alternating pattern with a constant pitch. However, the length of the non-transparent regions 3 and transparent regions 4 in the direction of displacement x need not be uniform. The non-transparent regions 3 are low-transmittance areas (preferably opaque), while the transparent regions 4 are high-transmittance areas (preferably transparent).

The partially transparent plate 2 can, for example, be fabricated in the following manner. A transparent substrate such as a glass plate or a clear plastic plate is printed with a black coating composition at a predetermined pitch to form the non-transparent regions 3 thereon, leaving uncoated transparent areas for use as the transparent regions 4. The surface of the partially reflective member 5 similarly has low-reflectance regions 6 and high-reflectance regions 7, each extending in a direction normal to the direction of deflection x, at the same pitch P as that of the pattern on the partially transparent plate 2. In this member, too, the length of the low-reflectance regions 6 and high-reflectance regions 7 in the direction of displacement x need not be uniform. The low-reflectance regions mentioned above preferably have a reflectance value of zero, while the high-reflectance regions preferably have a reflective alue as high as possible. The partially reflective plate 5 may for example be a high-reflectance surface formed by mirror-finish polishing or plating, and provided with the low-reflectance regions 6 formed by printing the surface with a light-absorbing black coating composition at the constant pitch, with the uncoated surface areas serving as the high-reflectance regions 7. The partially transparent plate member 2 is disposed parallel to the surface of the partially reflective member 5 in such a manner that the distance b between the partially transparent plate 2 and partially reflective member 5 is smaller than the pitch P of the patterns on the partially transparent plate 2 and partially reflective member 5.

The light-emitting means 8 and the light-receiving means 9 are disposed side by side on one side of the partially transparent plate 2 which is opposite to the side on which the partially reflective member 5 is disposed. The distance a from the light-emitting and light-receiving elements 8, 9 to the partially transparent plate member 2 is at least as large as the distance b between the partially transparent plate 2 and the partially reflective member 5. In this embodiment, both the partially reflective member 5 and the light-emitting and light-receiving means 8, 9 are stationary, while the partially transparent plate member 2 is displaceable. It should be understood that the light-emitting means 8 and the light-receiving means 9 may be disposed either at right angles or in parallel to the direction of displacement x of the direction of the patterns, or even optionally at another angle therewith.

When the transparent regions 4 of the partially transparent plate member 2 are in alignment with the high-reflectance regions of the partially reflective member 5, the light beam from the light-emitting means passes through the transparent regions 4 and is reflected by the high-reflectance regions 7, after which it passes through the transparent regions 4 again and is incident on the light-receiving means, where a high-intensity light is detected. In contrast, when the non-transparent regions 3 of the partially transparent plate member 2 are in alignment with the high-reflectance regions 7 of the partially reflective member 5 so that the high-reflectance regions 7 are shielded by the non-transparent regions 3, the light beam from the light-emitting means 8 passes through the transparent regions 4 and is reflected by the low-reflectance regions 6, after which it passes through the transparent regions 4 again and is incident on the light-receiving means 9, where a low-intensity light is detected. Therefore, as the partially transparent plate 2 is displaced by one pitch, the light-receiving means 9 outputs a sinusoidal wave signal of one wavelength (or a signal of one pulse) so that the amount of displacement of the partially transparent plate 2 can be found by multiplying the number of output pulses from the light-receiving element 9 by the value of p.

This displacement signal output device 1 is a reflective device in which both the light-emitting and light-receiving means are disposed on the same side of the partially transparent plate 2. Therefore, the light-emitting and light-receiving means can be mounted side by side in a compact arrangement so that the whole device 1 can be easily mounted or built into a machine or the like. In addition, the simplified structure of the device 1 contributes to a reduced manufacturing cost.

Figure 2:
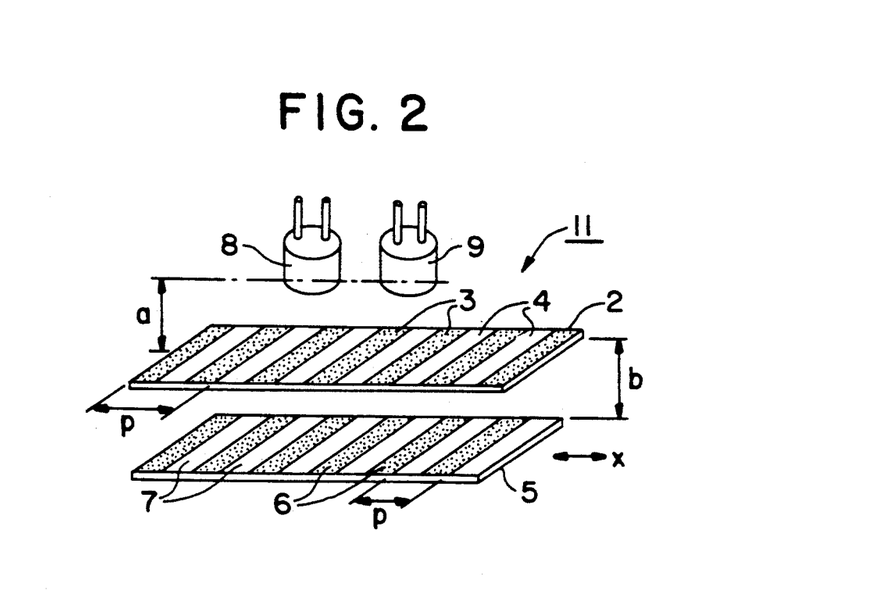
FIG. 2 is a perspective view showing a second embodiment of the invention.

A second embodiment of the displacement signal output device 11 is illustrated in FIG. 2. The configurations of its respective members are the same as those in the first embodiment but in this embodiment both the transparent plate 2 and the light-emitting and light-receiving means 8, 9 are stationary, while the partially reflective member 5 is displaceable, and the light-receiving means 9 outputs a displacement signal in timed relation with the displacement of the latter member 5.

Figure 3:
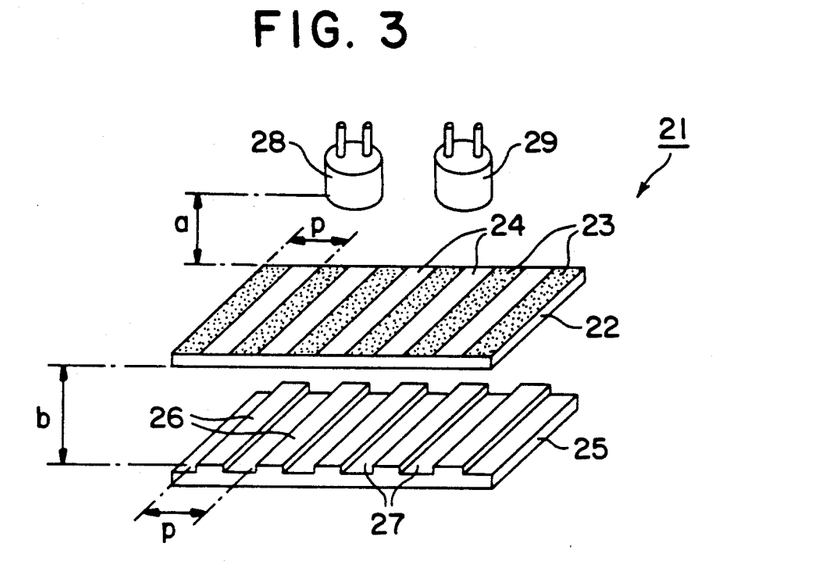
FIG. 3 is a perspective view showing a third embodiment of the invention.

Still another displacement signal output device 21, which is a third embodiment of the invention, is illustrated in FIG. 3. In this embodiment, a light-emitting means 28 and a light-receiving means 29 are disposed in face-to-face relationship to a partially transparent plate 22 which has transparent regions 24 and non-transparent regions 23 in an alternating pattern with a constant pitch of p, and a corrugated reflective member 25 is disposed on the other side of the partially reflective plate 22.

The surface of the corrugated reflective member 25 has convex regions 26 and concave regions 27 in an alternating pattern with the same pitch as that of the pattern on the partially transparent plate member 22. In this embodiment, the convex regions need not differ from that of the concave regions in surface reflectance but both may be equal in reflectance, and either the partially reflective plate 22 or the corrugated reflective member 25 is displaced relative to said light-emitting and light-receiving means 28, 29.

Figure 4A:
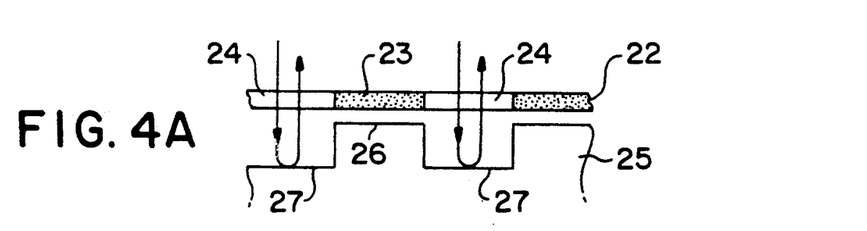
FIGS. 4(a) and (b) are diagrams showing the principle of operation of the above embodiment.
Figure 4B:
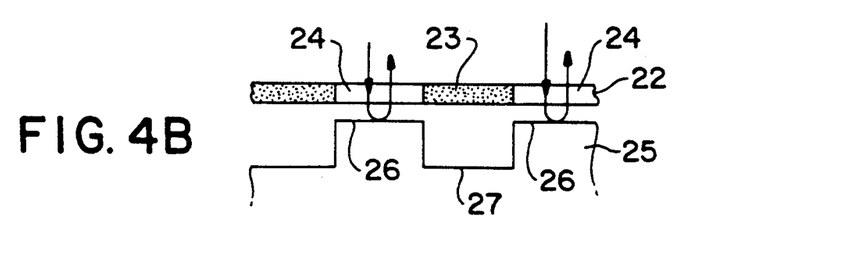

In the construction according to this invention, the distance b between the partially transparent plate 22 and the corrugated reflective member 25 is smaller than the pitch P of their patterns. FIG. 4(a) and 4(b) illustrate alignments, and reference numerals thereof correspond to those in FIG. 3. When the transparent regions 24 of the partially transparent plate member 22 are in alignment with the convex regions 26 as illustrated in FIG. 4(b), the light beam, having passed the transparent regions 24 of the partially transparent plate 22, is immediately reflected by the convex regions 26 of the corrugated reflective member 25 and passes through the transparent regions 24 again so that the attenuation of reflected light due to scattering is mitigated because of the short light path involved, and, hence, a high-intensity light is incident on the light-receiving means 29. In contrast, when the transparent regions 24 of the partially transparent plate 22 are in alignment with the concave regions 27 of the member 25 as illustrated in FIG. 4(a), the light beam, having passed through the transparent regions 24, is reflected by the concave regions 27 and passes through the transparent regions 24 again. However, because the light path involved here is longer, the attenuation of reflected light due to scattering is large so that the intensity of light incident on the light-receiving means 29 is comparatively low. Therefore, in this invention, the partially reflective member 25 can be made of an optional material chosen from a wide range of materials. Thus, a gear, a screw, a slider of a linear pulse motor, or the like can be utilized, as such, for the corrugated reflective member 25 in the present invention.

Figure 5:
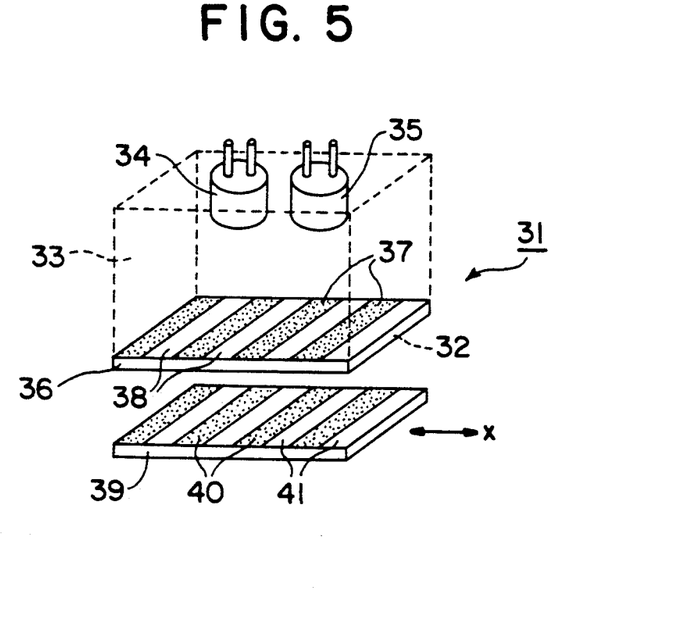
FIG. 5 is a schematic perspective view showing a fourth embodiment of the invention.

Still another displacement signal output device, as a fourth embodiment of the invention, is shown in FIG. 5. In this displacement signal output device 31, a light-emitting means 34 and a light-receiving means 35 are packaged in a housing 33 having a window 32 for admission of the detection light to be incident on the light-receiving means 35. This window 32 is fitted with a partially transparent plate 36 having low-transmittance regions 37 and high-transmittance regions 38 in an alternating pattern with a constant pitch.

Therefore, in this embodiment, the light-emitting and light-receiving means 34, 35 and the partially transparent plate 36 can be provided as a single integrated component, with the result that the whole device can be compact and easy to install. Thus, when the above package is disposed against a partially reflective member (a partially reflective member having low-reference regions 40 and high-reflectance regions 41 is shown in FIG. 5) attached to the surface of an object whose displacement is to be detected, a pulse or other signal representative of the displacement can be made available from the light-receiving means 35. It should be understood that the package 33 in this embodiment may be an assembly of light-emitting and light-receiving means 34, 35 with the partially transparent plate 36 as molded one-piece using a resin material.

Figure 6:
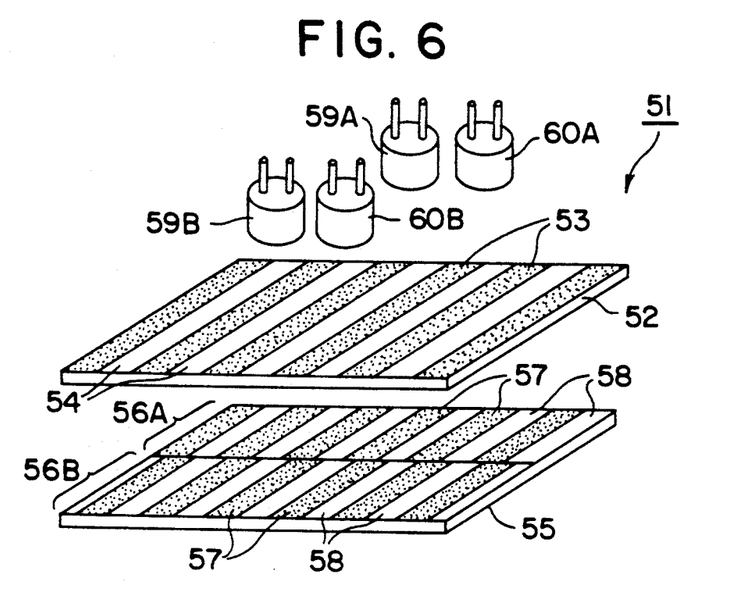
FIG. 6 is a perspective view showing a fifth embodiment of the invention.
Figure 7:
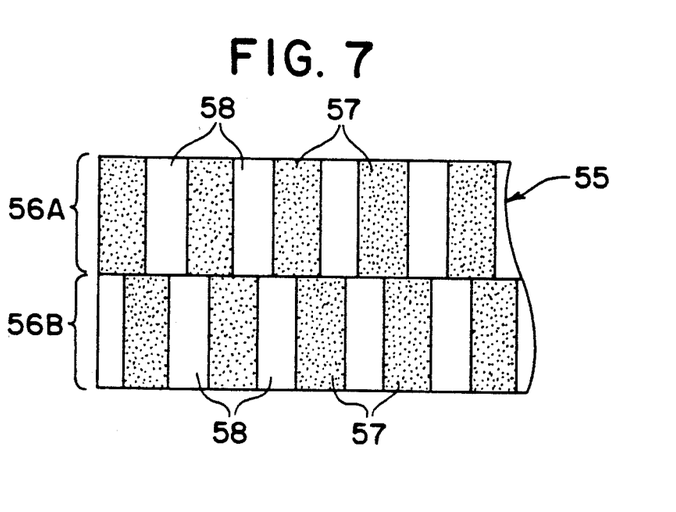
FIG. 7 is a fragmentary plan view showing the partially reflective member of the above embodiment.

FIG. 6 is a perspective view showing a displacement signal output device as a fifth embodiment of the invention. This device 51 includes a partially transparent plate 52 having high-transmittance regions 54 and low-transmittance regions 53, each extending throughout the entire width, in an alternating pattern with a constant pitch. A partially reflective member 55 has partial patterns 56A, 56B on both sides of a line parallel to the direction of displacement, with either pattern consisting of high-reflectance regions 58 and low-reflectance regions 57 in an alternating pattern with the same pitch as that of the pattern on the partially transparent plate 52. However, as better seen from FIG. 7, the two partial patterns 56A, 56B are displaced from each other by pitch n ($0 < $½; preferably ¼ pitch). The partial patterns 56A, 56B on the partially reflective member 55 are confronted by light-emitting means 59A, 59B and light-receiving means 60A, 60B, respectively, with the partially transparent plate 52 interposed. Each set of light-emitting light receiving means 59A, 59B or 60A, 60B may be an integrated reflection type photosensor. Also, an arrangement is possible in which the light-receiving members 60A, 60B are disposed face-to-face with the partial patterns 56A, 56B, respectively, and a single light projector is used in common.

Figure 8:
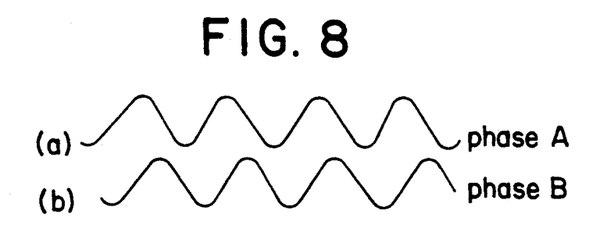
FIG. 8 is a diagram illustrating the pulse waves detected by the light-receiving element in the above embodiment.
Figure 9:
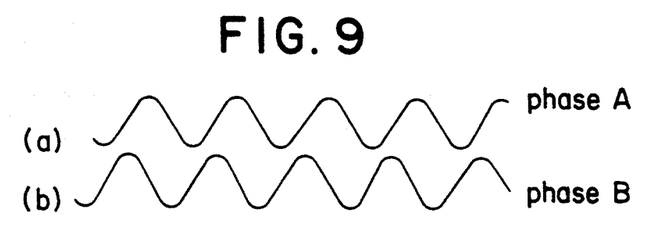
FIG. 9 is a similar diagram illustrating the pulse waves detected by the light-receiving element in the same embodiment.

Displacement of the partially transparent plate 52 or the partially reflective plate 55 results in an advance of phase A of the partial pattern 56A detected by the light-receiving means 60A relative to the phase B of the partial pattern 56B detected by the light-receiving means 60B as illustrated in FIG. 8 (a) (b), or a delay of phase A of the partial pattern 56A detected by the light-receiving means 60A relative to phase B of the partial pattern B detected by the light-receiving means 60B as illustrated in FIG. 9 (a) (b). Therefore, the direction of displacement of the partially transparent plate 52 or of the partially reflective member 55 can be readily detected from the above phase shift.

Figure 10:
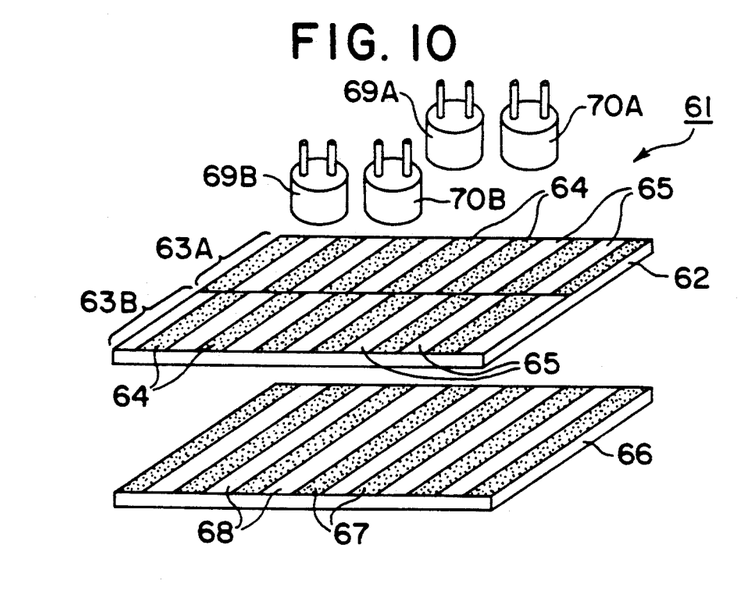
FIG. 10 is a perspective view showing a sixth embodiment of the invention.

A sixth embodiment of the displacement signal output device of the invention is illustrated in FIG. 10. This device, indicated by 61, includes a partially reflective member 66 which has high-reflectance regions 68 and low-reflectance regions 67, each extending throughout the entire width, in an alternating pattern with a constant pitch. A partially transparent plate 62 is formed with partial patterns 63A, 63B on both sides of a line parallel to the direction of displacement, and each of the partial patterns 63A, 63B has transparent regions 65 and non-transparent regions 64 in an alternating pattern with the same pitch as that of the pattern on the partially reflective member 66. However, the two partial patterns are displaced from each other by pitch n ($0 < $n½; preferably ¼ pitch). These partial patterns 63A, 63B of the partially transparent plate 62 are confronted by corresponding sets of light-receiving means 69A, 69B and light-receiving means 70A, 70B, with the partially transparent plate 62 interposed between. Therefore, in this embodiment of the partially transparent member 62 or the partially reflective member 66 can be successfully detected.

Referring to the fifth and sixth embodiments described above, it is optional which of the partially transparent members and the partially reflective members is displaceable and, of course, the reflective regions may be formed by corrugation.

Figure 11:
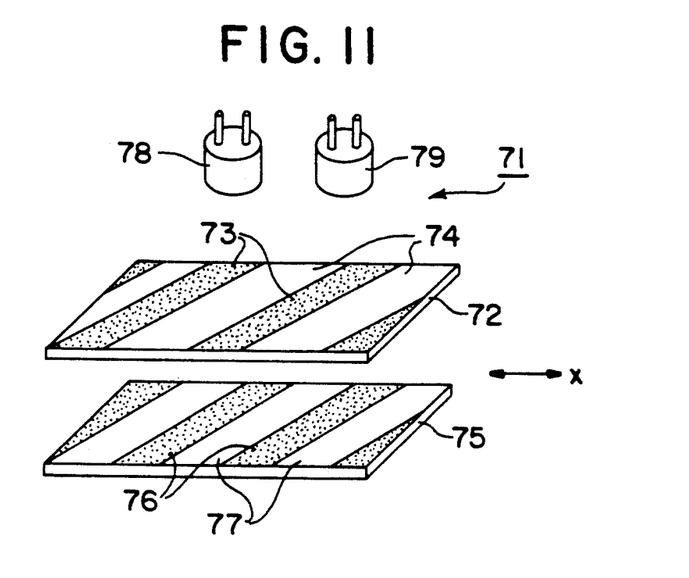
FIG. 11 is a perspective view showing a seventh embodiment of the invention.

Illustrated in FIG. 11 is a seventh embodiment of the displacement signal output device. This device, indicated by 71, includes a partially transparent member 72 which has high-transmittance regions 74 and nontransmittance regions 73 in an alternating pattern of stripes inclined in respect to the direction of displacement x at a constant pitch. Similarly, a partially reflective member 75 also has high-reflectance regions 77 and low-reflectance regions 76 in an alternating pattern of stripes inclined in respect to the direction of displacement x at the same pitch as above. The reference numeral 78 indicates a light-emitting means, while the numeral 79 indicates a light-receiving means.

The patterns on the partially transparent member and partially reflective plate need not be stripes extending in the direction of displacement but, as in the case of the embodiment shown in FIG. 11, they may be inclined in respect to the direction of displacement. Of course, other kinds of patterns may be adopted unless the effect of the invention is adversely affected.

Figure 12:
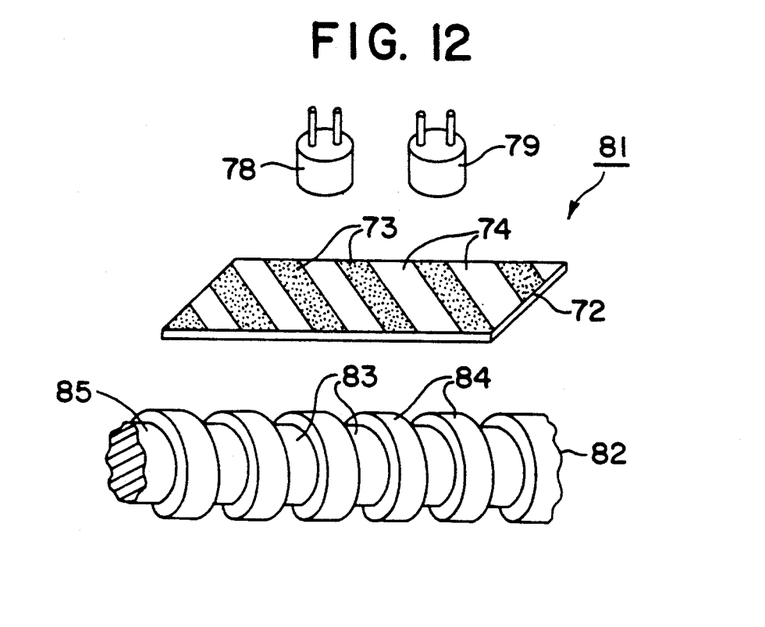
FIG. 12 is a perspective view showing an eighth embodiment of the invention.

Still another displacement signal output device, as an eighth embodiment of the invention, is shown in FIG. 12. In this device, indicated by 81, a corrugated reflective member 82 having a pattern inclined with respect to the direction of displacement is used in lieu of the partially reflective member of the seventh embodiment. This corrugated reflective member 82 has convex regions 84 in the form of a continuous spiral on the circumferential surface of a shaft 85, with concave regions 83 being formed between the convex regions. In an overhead view, the concave regions 83 and the convex regions 84 are arranged in an alternating pattern with a constant pitch.

As such, there may be utilized, for the corrugated reflective member 82, a slider, a screw or the like so that the angle of rotation of a screw or the amount of advance of other parts can be detected.

While, in the above embodiments, the periodic patterns employed are linear, the invention may of course be embodied using a circumferentially periodic pattern like the disk slit pattern of the rotary encoder.

In accordance with the present invention, the light-emitting means and the light-receiving means can be disposed compactly on the same side so that the displacement signal output device can be reduced in thickness. For the same reason, the device can be easily installed or built into a machine.

Moreover, since the distance between the transparent and reflective members is smaller than their pattern pitch, the regions giving a higher intensity of reflected light and the regions giving a lower intensity of reflected light in the latter member can be formed as high-reflectance regions, respectively, or be constituted by concave and convex regions of the same surface reflectivity. Therefore, many restrictions on the raw material and structure of the reflective member are eliminated, thus broadening the range of use of the displacement signal output device.

Furthermore, inasmuch as the invention is simple in principle and construction, the device can be easily adjusted and the manufacturing cost is also reduced.

The above description and the accompanying drawings are merely illustrative of a few modes of application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A displacement signal output device comprising a first member having high-transmittance regions and low-transmittance regions in a first alternating pattern with a constant pitch; a second member having high-reflectance regions and low-reflectance regions in a second alternating pattern with said pitch; said first member and second member facing each other and spaced apart by a distance smaller than said pitch; a light-emitting means for emitting a detecting light beam; and a light-receiving means for receiving reflected light, said light-emitting means and light-receiving means being both disposed on a side of said first member which is opposite to a side on which said second member is disposed, and said first and second member cooperating together and having a direction of displacement relative to each other, the second pattern of said high-reflectance regions and low-reflectance regions of said second member being a spiral formation of a circumferential surface of a cylinder corresponding to said pitch, the first pattern of said high-transmittance regions and said low-transmittance regions of said first member being inclined with respect to an axis of said second member and having a pitch equal to that of said pitch of the pattern of said second member, and said first pattern of said first member and said second pattern of said second member being displaceable relative to each other as said second member revolves about said axis.

2. A displacement signal output device according to claim 1, wherein said second pattern of high-reflectance regions and low-reflectance regions of said second member comprise a corrugated surface.

3. A displacement signal output device according to claim 1, further comprising a housing for packaging said light-projecting means and light-receiving means, said housing having a window, and said first member being affixed to said window.

4. A displacement signal output device according to claim 1, wherein said first pattern of said first member comprises at least two partial patterns separated in a direction parallel to a direction of deflection, and a plurality of said light-receiving means being disposed in positions respectively corresponding to said partial patterns.

* * * * *